(12) United States Patent
Gaboury et al.

(10) Patent No.: US 7,460,586 B1
(45) Date of Patent: Dec. 2, 2008

(54) SELECTIVE SIGNAL COUPLING IN HIGH SPEED I/O CIRCUITS

(75) Inventors: Michael J. Gaboury, Burnsville, MN (US); Brian T. Brunn, Austin, TX (US)

(73) Assignee: XILINX, Inc., San Jose, CA (US)

(*) Notice: Subject to any disclaimer, the term of this patent is extended or adjusted under 35 U.S.C. 154(b) by 893 days.

(21) Appl. No.: 10/919,759

(22) Filed: Aug. 17, 2004

(51) Int. Cl.
*H04B 1/38* (2006.01)

(52) U.S. Cl. ........................................ 375/219

(58) Field of Classification Search ............... 375/219, 375/256, 257, 258, 222; 333/81 R, 109
See application file for complete search history.

(56) References Cited

U.S. PATENT DOCUMENTS 5,627,501 A * 5/1997 Biran et al. ............... 333/17.1
7,187,530 B2 * 3/2007 Salling et al. ............... 361/111
2005/0093661 A1 * 5/2005 Gomez et al. ............... 333/204

OTHER PUBLICATIONS

U.S. Appl. No. 10/659,971, filed Sep. 11, 2003, Boecker et al.

* cited by examiner

*Primary Examiner*—Khai Tran
(74) *Attorney, Agent, or Firm*—LeRoy D. Maunu

(57) ABSTRACT

According to an example embodiment, a data-transfer circuit transfers high-speed input data toward an output port by coupling the data circuit selectively through a resistive-impedance circuit and a capacitive-impedance circuit to accommodate both high-frequency and low-frequency components of the input data signal. In a particular implementation, the control circuit can selectively control the data-passing circuit path by causing the input data to pass through the resistive-impedance circuit and therein pass low-frequency components of the input data signal while the capacitive-impedance circuit passes high-frequency components of the input data signal.

27 Claims, 3 Drawing Sheets

SELECTIVE SIGNAL COUPLING IN HIGH SPEED I/O CIRCUITS

FIELD OF THE INVENTION

The present invention relates generally to integrated circuit design. More particularly, the present invention relates to circuits that improve compatibility between devices for various applications, including high-speed data transfer applications.

BACKGROUND OF THE INVENTION

Demands for high-speed data processing and communication continue to push the electronics industry to develop faster and higher-functioning circuits while, at the same time, reducing power consumption. To various degrees, these demands have been realized in very large scale integration of circuits that operate at relatively low power supply voltages. Technologies such as telecommunications and networking, for example, continue to fuel research and design efforts that facilitate serial data rate capabilities on the order of tens or hundreds of gigabits per second and higher. In a typical application, the clock source provides the high-frequency signal that used to achieve these high serial data rate capabilities. In this manner, the high-speed clock source permits such circuitry to achieve its high-speed data-processing operation.

A challenge in such high-speed communication systems is that the systems can be expensive and difficult to upgrade. New semiconductor processes and circuits used to implement the high-speed communication systems are implemented with demands for improving cost and performance. However, it is difficult to meet these cost and performance demands in new designs when the newer designs require special and often outdated interface circuitry for connecting to components in the older systems. Thus, cost and performance are typically improved by providing creative approaches for retrofitting the newly designed components into the older systems. Where these creative approaches increase the overall speed of operation, additional cost and performance advantages can be realized.

As a specific example, newer processes and circuits would typically use power supply voltages that are much smaller that those used with old processes and circuits. To be backward compatible with older systems, the newer designs must be able to receive signals at a higher voltage than desired with the new process. While it may be possible to use on-chip AC-signal coupling to achieve a compatible interface between devices operating at different supply voltages, this approach assumes a requisite size for an on-chip capacitor that imposes an undesirable and/or intolerable lower limit on input frequencies.

Some communication standards also require that the high-speed data inputs be able to recover for long periods at a fixed value. The approach mentioned above cannot support this requirement without some modification since long term charge will build up on the AC-signal coupling capacitors and the time constant will be longer than required by many applications and standards.

Accordingly, an approach that addresses the aforementioned problems, as well as other related problems, is desirable.

SUMMARY OF THE INVENTION

Various aspects of the present invention are directed to a wide variety of applications including but necessarily limited to newly-designed circuits and processes and retrofit-type applications. Implementations of the present invention are intended to serve such applications in a manner that addresses and overcomes the above-mentioned issues as well as others.

According to a first example embodiment, the present invention is directed to a data-transfer circuit that transfers input data toward an output port by coupling the data-transfer circuit selectively to accommodate both high-frequency and low-frequency components of the input data signal. In a particular implementation, a data-transfer circuit includes a resistive-impedance circuit and a capacitive-impedance circuit, and the control circuit enables the resistive-impedance circuit for passing low-frequency components of the input data signal while enabling the capacitive-impedance circuit for passing the high-frequency components.

According to another specific embodiment, a data-transfer circuit includes first and second coupling circuits. The first coupling circuit includes an impedance circuit and is adapted to couple AC components of the input data during steady-state data communication after a time interval during which the data is not being transmitted and/or received. The second coupling circuit is adapted to couple the input data, and a control circuit is adapted to control at least one of the first and second coupling circuits and therein direct the input data toward the output port as a function of this data-inactive time.

According to yet another specific embodiment, one or more of the above-characterized data-transfer circuits passes the data in differential form over a differential data bus with ESD protection circuitry connected to the differential data bus. The data-transfer circuit can further include a common-mode voltage control circuit adapted to provide DC-voltage adjustment to the input data after the input data passes through the coupling circuit. For data being passed at a rate that exceeds one GHz, to lessen signal distortion, the data-transfer circuit can further include an impedance-termination circuit for the input data before the input data passes through the coupling circuit.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
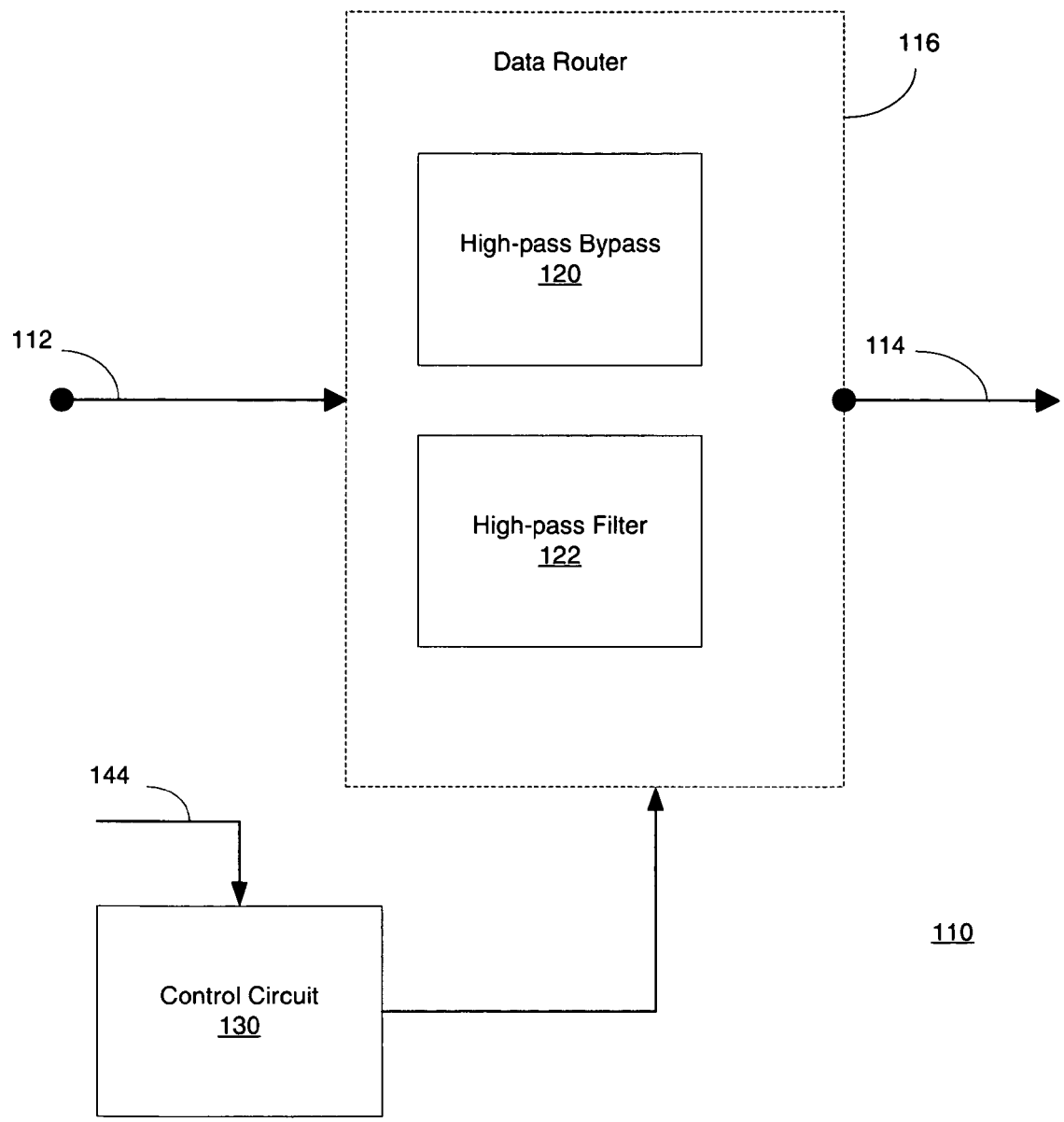
FIG. 1 is a block diagram of a high-speed data-transfer circuit implemented in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

The present invention is believed to be generally applicable to digital high-speed data transfer (aka., input/output or "I/O") circuits involving ostensibly incongruent circuit interfaces. The invention has been found to be particularly advantageous for such high-speed data applications benefiting from retrofit-type designs. Examples of applications that might realize significant benefit from the present invention include those applications implemented using general-purpose integrated circuits and programmable logic devices. While the present invention is not necessarily limited to such applications, an appreciation of various aspects of the invention is best gained through a discussion of examples in such an environment.

As a first example, the present invention involves a data-transfer circuit having I/O ports that employ a high-frequency clock signal to drive high-speed data through the I/O circuitry. The I/O circuitry connects to a conventionally wired data path (e.g., serial, differential or other) that may or may not be part of another data path (wired or wireless). This wired data path couples the high-speed data to a coupling circuit which is adapted to couple AC components of the input data and which is controlled by a control circuit that manipulates the high-speed data via a resistive-impedance circuit and/or a capacitive-impedance circuit. More particularly, the control circuit uses the capacitive-impedance circuit to pass high-frequency components of the input data signal and, for particular applications, activates the resistive-impedance circuit to permit passage of low-frequency (and DC) components of the input data signal. In a more particular embodiment, a resistive-impedance circuit is implemented as a resistive switch (such a conventional MOSFET switch) for passing lower frequency components of the data signal. In another particular embodiment, the resistive-impedance circuit is implemented using both resistive and capacitive circuits in order to pass DC components and relatively low-frequency AC components.

As more particular embodiments involving the above-characterized data-transfer circuit, the control circuit is programmed to selectively enable one or both of the resistive-impedance and capacitive-impedance circuits. For an example application that does not tolerate much loss of high-speed data at power-up or after an extended interval when the data is inactive (e.g., data recovery for a voltage-controlled oscillator), the resistive- and capacitive-impedance circuits are arranged in parallel. The control circuit is programmed to selectively enable both parallel circuits until the data-inactive time lapses, at which time (i.e., steady-state) only the capacitive-impedance circuit is enabled. In certain implementations, the control-circuit programming is data encoded (e.g., as a microcomputer), and in other implementations the control-circuit programming is carried out by discrete circuits such as a resistive-capacitor timing circuitry based on FET (Field Effect Transistor) technology or edge-triggered timing circuitry that detects passage of certain periods or sequences of data.

In accordance with the present invention, FIG. 1 is a schematic block diagram of the relevant portion of an integrated circuit implemented as an FPGA (field programmable gate array) 110. As this illustrated circuitry may be used in applications other than FPGA-type integrated circuits, the following discussion refers to this circuitry as a data-transfer circuit 110. The data-transfer circuit 110 is adapted to transfer data from an input port 112 toward an output port 114. The input data is passed from the input port 112 to a data-routing circuit 116 which provides a bypass circuit 120 and a capacitive-impedance circuit 122 for selectively AC-coupling (or passing AC components of) the input data. The data-routing circuit 116 routes the data through one or both of these circuits 120 and 122 to provide certain filter-related operations. For example, during steady-state operation in which the input data is being transmitted by a high-speed clock (e.g., 1-5 GHZ), the capacitive-impedance circuit 122 is used to pass the input data in a manner that avoids the development of a DC-offset voltage at the output port 114. In this context, the capacitive-impedance circuit 122 acts as a high-pass filter. To avoid the potential loss of data before this steady-state operation and also for applications in which the DC-offset voltage is not a concern, the data routing circuit 116 can route the data through the circuit 120 to bypass this high-pass filter operation.

Specific circuit implementations for the bypass circuit 120 and the capacitive-impedance circuit 122 are dependent on the circuit application and the data being coupled from the input port 112 toward the output port 114. Per the above example where the input data is being transmitted by a clock running in the range of about 1-5 GHZ, the bypass circuit 120 is implemented using a conventional all-pass filter circuit, and the capacitive-impedance circuit 122 is implemented using a conventional high-pass filter circuits with a cut-off frequency selected relative to circuit specifications provided for the data-inactive time.

A control circuit 130 is used to selectively enable and disable (or activate/inactivate) one or both of the bypass circuit 120 and the capacitive-impedance circuit 122. In a less complex implementation, the control circuit 130 is implemented as a digital switch having a factory-set logic state that is selected based on the circuit specifications established for coupling the input data at port 112 to the port 114. Such a digital switch can be implemented, for example, via physical fuse-type wiring or a manually-set single-pole double throw switch.

In a more complex implementation, the control circuit 130 is implemented using data-controlled digital logic having a logic state that is selected based on data provided from a circuit node 144. For example, in an application where the control circuit 130 is implemented as a microcomputer, the circuit node 144 provides a data path either for programming the microcomputer to provide selection control for enabling the bypass circuit 120 as a function of the recovery timing for the input data, for permanently disabling the bypass circuit 120, or for selectively enabling the bypass circuit 120 as a function of other issues such as detected levels of DC-offset developing at the output put 114. In this latter instance, the circuit 110 includes a DC-offset detector (not shown) coupled to the output port 114, and the circuit node 144 provides a feedback data path for commanding the control circuit in this regard.

Figure 2:
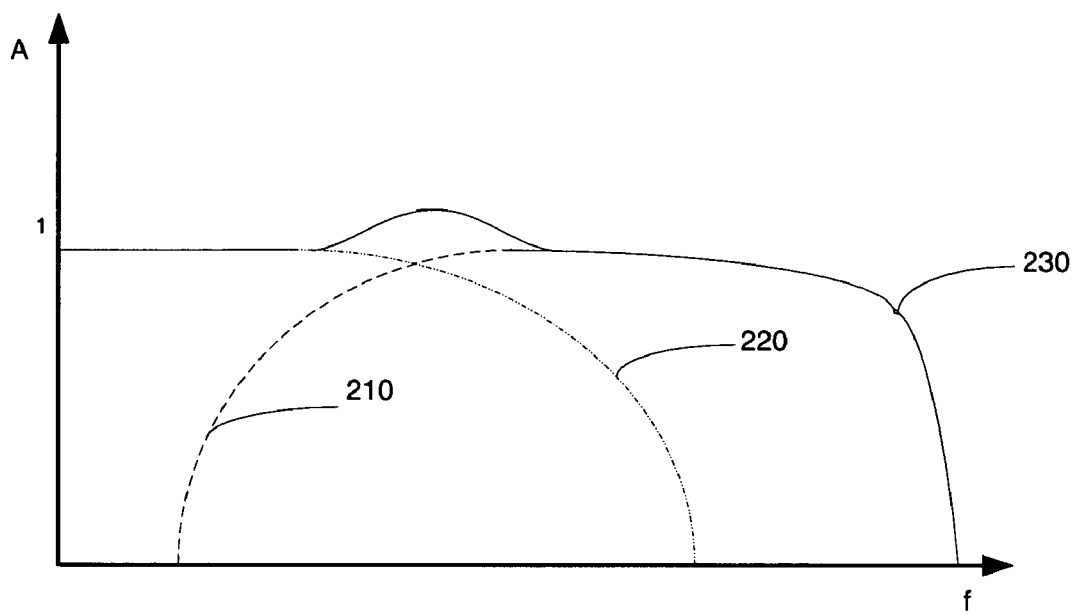
FIG. 2 is a graph showing transfer functions realized by a particular implementation of the present invention.

FIG. 2 illustrates the transfer functions the data-routing circuit 116 for a particular example of an application of the present invention. The plot 210, as depicted by the line composed of longer dashes, shows the high-pass filter response of the data-routing circuit 116 when only the capacitive-impedance circuit 122 is enabled. The plot 220, as depicted by the line composed of shorter dashes, shows the low-pass filter response of the data-routing circuit 116 when only the bypass circuit 120 is enabled. The plot 230, as depicted by the solid line, shows the response of the data-routing circuit 116 when both the bypass circuit 120 and the capacitive-impedance circuit 122 are enabled. As indicated by the approximate unity gain along the vertical axis, for each of these transfer functions, the data-routing circuit 116 manifests a slight loss.

Figure 3:
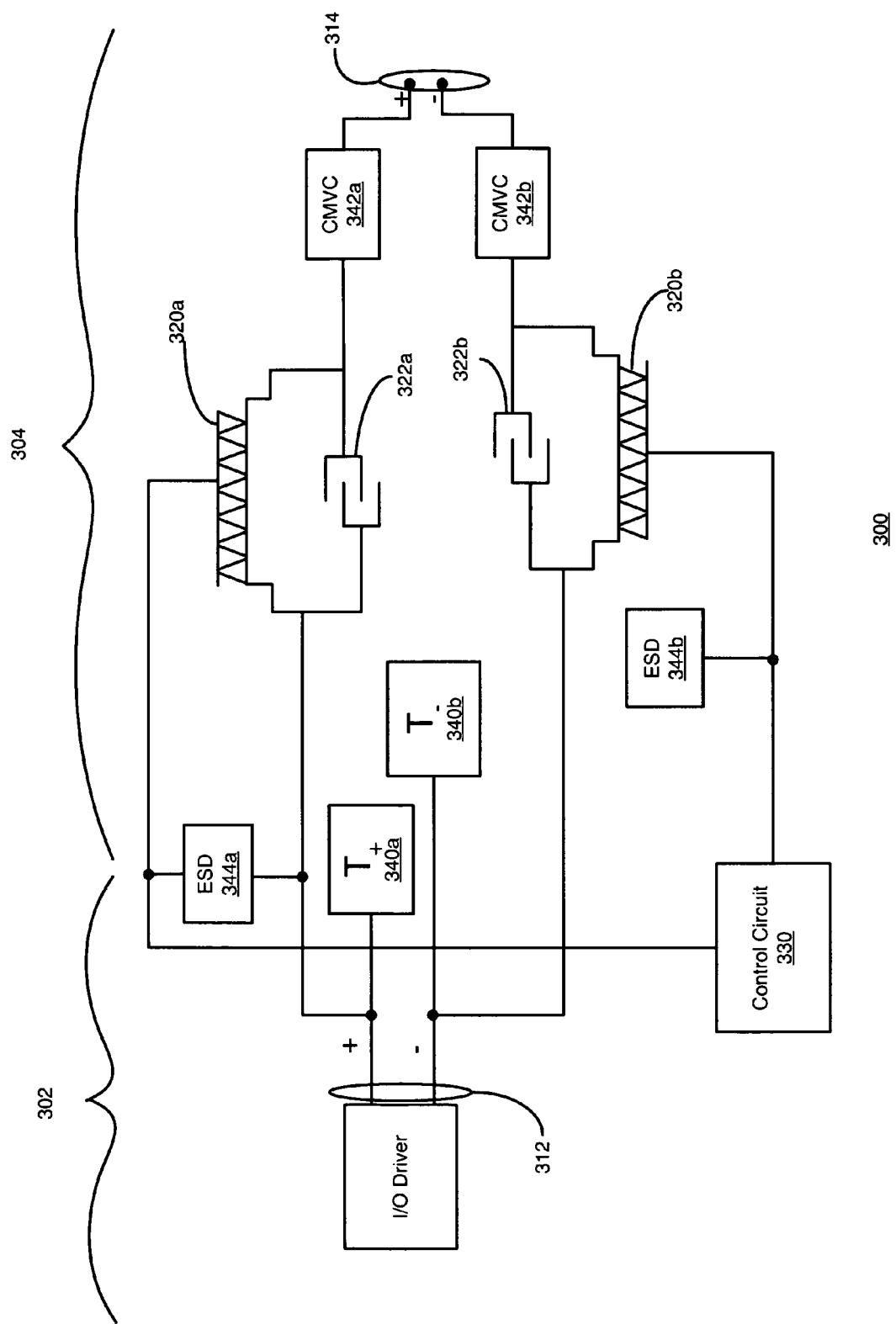
FIG. 3 is a schematic diagram of a specific high-speed data-transfer circuit implemented in accordance with the present invention.

Also in accordance with the present invention, FIG. 3 is a schematic diagram of another particular data-transfer circuit 300 that is implemented to provide an interface for passing differential data between a first circuit 302 and a second circuit 304. Consistent with the similarly-numbered circuits of FIG. 1, the data-transfer circuit 300 is adapted to transfer differential data from an input port 312 toward an output port 314 (analogous to respective ports 112 and 114 of FIG. 1). The differential input data is passed from the input port 312 to a data-routing circuit that is implemented via a resistive-impedance circuit 320 (320a and 320b) and a capacitive-impedance circuit 322 (322a and 322b). The resistive-impedance (or resistive switch) circuit 320 may be implemented as a conventional FET having its gate connected to the output of a control circuit 330. The capacitor 322 may be implemented as a "finger capacitor" which is formed from multiple layers of metal laid out such that each metal layer is in stripes of alternating positive and negative plates. On each successive layer the pattern is alternated so that any individual stripe is surrounded by stripes of the opposite plate. This approach provides a reasonable capacitance per unit area of layout by way of a non-polarized structure. Alternatively, although less desirable for many applications, the capacitor 322 can be implemented as a more conventional FET-type capacitor which is heavily dependent on its DC-bias conditions. The impedance values of these circuits are not critical and are selected based on the circuit specifications for providing the appropriate interface.

As described above, the control circuit 330 is implemented to selectively enable the resistive-impedance circuit 320 as a function of the circuit specifications For example, the resistive-impedance circuit 320 can be enabled as a function of the tolerated recovery time before steady-state operation and/or during steady-state operation as a function of data recovery timing requirements. In this particular circuit implementation, the capacitive-impedance circuit 322 is enabled at all times for AC-coupling the input data toward the output port 314, whereas the control circuit 330 switches the resistive-impedance circuit 320 between a current passing state and a current blocking state.

In various applications, circuit specifications may require additional circuitry that performs complementary functionality. Examples of such complementary circuits are shown as a data-termination circuit 340, a common-mode voltage control circuit 342 and an ESD (electro-static discharge) circuit 344. Due to the high frequency of the data being interfaced from the first circuit 302 to the second circuit 304, the data-transfer circuit 300 can include the data-termination circuit 340 (340a and 340b) to avoid the adverse effects of an impedance mismatch looking into the circuit 304. The common-mode voltage control circuit 342 (342a and 342b) is adapted to adjust the transferred data to the appropriate DC levels for further processing. As might be needed due to adverse environmental conditions, the ESD circuit 344 (344a and 344b) provides over/under power-condition electro-static discharge (ESD) protection with discharge circuitry being coupled to a power terminal such as Vcc/Vdd for each susceptible node.

As one of ordinary skill in the art would appreciate, other embodiments may be derived from the teaching of the present invention without deviating from the scope of the claims.

What is claimed is:

1. A data-transfer circuit for transferring input data toward an output port, comprising:
    a first coupling circuit, including an impedance circuit, adapted to AC-couple the input data to the output port during steady-state data communication after a data-inactive time;
    a second coupling circuit adapted to couple the input data to the output port; and
    a control circuit adapted to control at least one of the first coupling circuit and the second coupling circuit and therein direct the input data toward the output port as a function of the data-inactive time.

2. The data-transfer circuit of claim 1, wherein the impedance circuit is a capacitor.

3. The data-transfer circuit of claim 1, wherein the impedance circuit includes a finger capacitor.

4. The data-transfer circuit of claim 1, wherein each of the first and second coupling circuits is further adapted to provide a differential signal path.

5. The data-transfer circuit of claim 1, wherein each of the first and second coupling circuits is further adapted to provide a differential signal path, and the control circuit is further adapted to enable one of the differential signal paths while disabling the other of the differential signal paths.

6. The data-transfer circuit of claim 1, wherein the second coupling circuit is adapted to pass DC components of the input data.

7. The data-transfer circuit of claim 1, wherein the impedance circuit is at least part of a high-pass filter.

8. The data-transfer circuit of claim 1, wherein the first and second coupling circuits and the control circuit are implemented as part of an FPGA integrated circuit.

9. The data-transfer circuit of claim 1, wherein the second coupling circuit is a resistive switch.

10. The data-transfer circuit of claim 1, wherein the second coupling circuit includes at least one field-effect transistor, and wherein the second coupling circuit is adapted to switch between a current passing state and a current blocking state.

11. The data-transfer circuit of claim 1, wherein the first and second coupling circuits provide first and second signal paths, respectively arranged in parallel.

12. The data-transfer circuit of claim 1, wherein at least one of the first and second coupling circuits includes at least one field-effect transistor.

13. The data-transfer circuit of claim 1, wherein at least one of the first and second coupling circuits includes at least one field-effect transistor that is switched between current passing and current blocking states in response to the control circuit.

14. The data-transfer circuit of claim 13, wherein the first and second coupling circuits provide first and second signal paths, respectively arranged in parallel, and the field-effect transistor is switched between current passing and current blocking states to switch between the first and second signal paths.

15. A data-transfer circuit, comprising:
    a data path adapted to provide differential data;
    a first coupling circuit connected to the data path and including an impedance circuit, the first coupling circuit being adapted to AC-couple the differential data during steady-state data communication after a data-inactive time;
    a second alternative coupling circuit adapted to couple the differential data; and
    a control circuit adapted to control at least one of the first coupling circuit and the second coupling circuit and therein direct the differential data toward an output port as a function of the data-inactive time,
    wherein the control circuit is further adapted to enable one of the first coupling circuit and the second coupling circuit after the data-inactive time.

16. The data-transfer circuit of claim 15, wherein the first and second coupling circuits provide first and second signal paths, respectively arranged in parallel.

17. The data-transfer circuit of claim 15, wherein the first and second coupling circuits provide first and second signal paths, respectively arranged in parallel, and the second alternative coupling circuit includes a field-effect transistor that is switched between current passing and current blocking states to switch between the first and second signal paths.

18. The data-transfer circuit of claim 17, wherein field-effect transistor is switched between current passing and current blocking states after the data-inactive time.

19. A data-transfer circuit for transferring input data toward an output port, comprising:
   a high-pass filter, including a capacitive-coupling circuit, adapted to couple the input data to the output port during steady-state data communication after a data-inactive time;
   a low-pass filter, including a resistive-coupling circuit, adapted to couple the input data to the output port during at least a portion of the data-inactive time; and
   a control circuit adapted to enable one of the first coupling circuit and the second coupling circuit as a function of the data-inactive time.

20. A data-transfer circuit for transferring input data toward an output port, comprising:
   first means for AC-coupling the input data to the output port during steady-state data communication after a data-inactive time;
   second means for coupling the input data to the output port; and
   control means for controlling at least one of the first means and the second means and therein directing the input data to the output port as a function of the data-inactive time.

21. A method for transferring input data toward an output port, comprising:
   providing an AC-coupling path for the input data to the output port through an impedance circuit during steady-state data communication that follows a data-inactive time;
   providing an alternative coupling path for the input data to the output port; and
   controlling at least one of the AC-coupling path and the alternative coupling path and therein directing the input data toward the output port as a function of the data-inactive time.

22. The method of claim 21, wherein the alternative coupling path passes DC components of the input data.

23. The method of claim 21, wherein the alternative coupling path includes another AC-coupling path.

24. A data-transfer circuit for transferring input data toward an output port, comprising:
   a coupling circuit, adapted to couple the input data to the output port including a resistive-impedance circuit and a capacitive-impedance circuit, wherein the capacitive-impedance circuit is adapted to AC-couple the input data; and
   a control circuit adapted to control the coupling circuit by causing the input data to pass through the resistive-impedance circuit and therein pass low-frequency components of the input data signal while the capacitive-impedance circuit passes high-frequency components of the input data signal as a function of data-inactive time of the input data signal.

25. The data-transfer circuit of claim 24, wherein the coupling circuit is adapted to pass the input data in differential form, and further including a differential data path and ESD protection circuitry connected to the differential data path.

26. The data-transfer circuit of claim 25, further including a common-mode voltage control circuit adapted to provide DC-voltage adjustment to the input data after the input data passes through the coupling circuit.

27. The data-transfer circuit of claim 26, wherein the input data is passed at a rate that exceeds 1 GHz, and further including an impedance-termination circuit for the input data before the input data passes through the coupling circuit.

* * * * *